US009461790B2

(12) United States Patent
Cheng et al.

(10) Patent No.: US 9,461,790 B2
(45) Date of Patent: Oct. 4, 2016

(54) METHODS AND SYSTEMS FOR CONTROLLING CELLS IN A NETWORK

(71) Applicants:Fang-Chen Cheng, Randolph, NJ (US); Said Tatesh, Wiltshire (GB)

(72) Inventors: Fang-Chen Cheng, Randolph, NJ (US); Said Tatesh, Wiltshire (GB)

(73) Assignee: Alcatel Lucent, Boulogne-Billancourt (FR)

( * ) Notice: Subject to any disclaimer, the term of this patent is extended or adjusted under 35 U.S.C. 154(b) by 142 days.

(21) Appl. No.: 14/169,662

(22) Filed: Jan. 31, 2014

(65) Prior Publication Data

US 2015/0222399 A1 Aug. 6, 2015

(51) Int. Cl.
| | |
|---|---|
| *H04W 4/00* | (2009.01) |
| *H04L 5/00* | (2006.01) |
| *H04W 24/08* | (2009.01) |
| *H04W 48/12* | (2009.01) |
| *H04W 48/08* | (2009.01) |
| *H04W 24/02* | (2009.01) |

(52) U.S. Cl.
CPC .......... *H04L 5/0035* (2013.01); *H04L 5/0051* (2013.01); *H04W 24/08* (2013.01); *H04W 48/08* (2013.01); *H04W 48/12* (2013.01); *H04W 24/02* (2013.01)

(58) Field of Classification Search
USPC ......... 370/252–311, 328–352; 455/422–450, 455/507–561
See application file for complete search history.

(56) References Cited

U.S. PATENT DOCUMENTS

| 8,917,668 | B1 * | 12/2014 | Song et al. | 370/328 |
|---|---|---|---|---|
| 2011/0092234 | A1 * | 4/2011 | Kim et al. | 455/507 |
| 2012/0015657 | A1 * | 1/2012 | Comsa et al. | 455/436 |
| 2012/0281566 | A1 * | 11/2012 | Pelletier et al. | 370/252 |
| 2013/0182586 | A1 * | 7/2013 | Paladugu et al. | 370/252 |
| 2014/0086173 | A1 * | 3/2014 | Sadeghi et al. | 370/329 |
| 2014/0120893 | A1 * | 5/2014 | Malladi et al. | 455/418 |
| 2014/0134993 | A1 * | 5/2014 | Kwak et al. | 455/418 |

OTHER PUBLICATIONS

"Small cell enhancements—physical layer aspects—performance part," 3GPP TSG RAN Meeting #62, Dec. 3-6, 2013.
3GPP TR 36.872, 3rd Generation Partnership Project; Technical Specification Group Radio Access Network; Small cell enhancements for E-UTRA and E-UTRAN—Physical layer aspects (Release 12), V12.1.0, Dec. 2013.

(Continued)

*Primary Examiner* — Man Phan
(74) *Attorney, Agent, or Firm* — Harness, Dickey & Pierce, P.L.C.

(57) ABSTRACT

At least one example embodiment discloses a method of coordinating a change from a first operating state to a second operating state of a selected cell in a system. The method includes changing to an intermediate state from the first operating state based on first signaling information exchanged between a serving cell of a user equipment (UE) and the selected cell in the first operating state and at least one signal received by the selected cell in the first operating state from the UE, the first operating state being a dormant state and operating in the intermediate state based on second signaling information between the serving cell and the selected cell, third signaling information between the serving cell and the UE and transmission information between the UE and the selected cell, the intermediate state being between the first operating state and the second operating state, the second operating state being an on state where the selected cell serves the UE.

22 Claims, 6 Drawing Sheets

(56) References Cited

OTHER PUBLICATIONS

Lin, J., "Reply LS on Higher Order Modulation Evaluation Assumptions," 3GPP TSG RAN WG4 Meeting #68, Aug. 19-23, 2013.
Alcatel-Lucent Shanghai Bell et al., "Small Cell Discovery Performance based on UL Signals," 3GPP Draft; R1-135166 Small Cell on Final, 3rd Generation Patnership Project, vol. RAN WG1, Nov. 13, 2013.
Fujitsu, "Discussion on discovery and measurement of turned-off small cells," 3GPP draft; R1-134257 Discovery and Measurement of Small Cells, 3rd Generation Partnership Program, vol. RAN WG1, Sep. 28, 2013.
Ericsson, "Small cell on/off operational modes," 3GPP Draft; R1-135658, 3rd Generation Partnership Project (3GPP), vol. RAN WG1, Nov. 13, 2013.
Alcatel-Lucent et al., "System design for transistion time reduction and legacy UEs impacts for small cell ON/OFF," 3GPP Draft; R1-140161 Small Cell ONOFF Procedure Final, 3rd Generation Partnership Project (3GPP), vol. RAN WG1, Feb. 1, 2014.

* cited by examiner

METHODS AND SYSTEMS FOR CONTROLLING CELLS IN A NETWORK

BACKGROUND

Mobile radio frequency band(s) are both scarce and precious resources. After the inception of commercial mobile radio communication in the 1980's the numbers of subscribers have been growing exponentially. The underlying radio technology also has grown at a fast pace. In addition to conventional voice communication, data, video and real time gaming have been introduced.

These new services require a relatively higher number of bits transmitted in a unit time than conventional voice services. There are two main ways to achieve larger bit rate demands, first, efficient use of spectrum using advanced technology (based on, for example, multiple transmit and receive antennas) and, second, the use of a larger frequency band. As the frequency spectrum is already crowded the latter is often not feasible.

A service area may be divided into grids of macro cells, which may include clusters of smaller cells. The frequency band may be apportioned between the clusters so as to intelligently keep the co-channel interference low.

Small cell deployments within a larger macro cell efficiently use the spectrum and deliver the demand for the higher bit rate in the cell coverage areas. Generally the small cells use lower transmit power to serve a small area in the hot spot or hot zone where the demand for the service is high with high density of users, or in other words, they have a cell radius of a few meters to a few hundred meters. Small cells may use wireless or wired backhaul connections to the back bone network.

Wireless networks using the long-term evolution (LTE) standard may employ features, Coordinated Multi-Point Operation (CoMP), that allow UEs to be serviced by more than one base station. For example, when a UE works under the CA mode, the UE may be served by two or more cells, where one of the cells acts as a primary serving cell, and other cells act as secondary serving cells. Similarly, CoMP allows UEs to be served by more than one base station in order to enhance quality of service (QoS) on the perimeter of a serving cell.

Resource and spatial coordination are aspects in CoMP technologies in wireless communication to improve system capacity. Most of techniques in the CoMP technology developments use a centralized controller/scheduler for resource and spatial coordination among transmission points (TPs) in the CoMP cooperating set.

SUMMARY

The inventors have discovered methods a systems for enabling a small cell to achieve a transition service switching between off/on (e.g., in less than 40 ms). More specifically, the inventors have discovered a pseudo-on state for a dormant small cell.

A dormant cell is a cell not to serve any UEs. A cell in a pseudo-on state is a dormant cell in the transition period of preparing to be active.

At least one example embodiment discloses a method of coordinating a change from a first operating state to a second operating state of a selected cell in a system. The method includes changing to an intermediate state from the first operating state based on first signaling information exchanged between a serving cell of a user equipment (UE) and the selected cell in the first operating state and at least one signal received by the selected cell in the first operating state from the UE, the first operating state being a dormant state and operating in the intermediate state based on second signaling information between the serving cell and the selected cell, third signaling information between the serving cell and the UE and transmission information between the UE and the selected cell, the intermediate state being between the first operating state and the second operating state, the second operating state being an on state where the selected cell serves the UE.

In an example embodiment, the changing to an intermediate state includes obtaining, by the selected cell in the first operating state, sounding reference signal (SRS) configuration information of a user equipment (UE) from a serving cell of the UE, obtaining a reference signal from the UE in the first operating state based on the SRS configuration information, determining whether a measurement associated with the reference signal exceeds a threshold and changing to the intermediate state if the measurement exceeds the threshold.

In an example embodiment, the operating in the intermediate state includes sending a signaling information to the serving cell, the signaling information including the measurement when the measurement exceeds the threshold and receiving channel state information reference signals (CSI-RS) configuration information, from the serving cell, for the selected cell based on the signaling information if the serving cell determines the selected cell is in preparation of changing from the first operating state to the second operating state.

In an example embodiment, the method further includes transmitting CSI-RS signals to the UE and receiving a signal from the serving cell receiving a channel state information feedback from the UE based on the measurements of the transmitted CSI-RS signals from the selected cell, the signal from the serving cell instructing the selected cell to change from the intermediate operating state to the second operating state.

In an example embodiment, the measurement is a signal to interference plus noise ratio (SINR).

In an example embodiment, the operating in the intermediate state includes receiving an activation message and forwarding data from the serving cell, the activation message from the serving cell indicating that the selected cell will be a primary cell for the UE.

In an example embodiment, the method further includes transmitting data to the UE only after receiving the activation signal and the forwarding data.

At least another example embodiment discloses a method of coordinating a change from a first operating state to a second operating state of a selected cell in a system. The method includes instructing, by a serving cell of a user equipment (UE), the selected cell to change to an intermediate state from the first operating state based on first signaling information between the serving cell of the UE and the UE when the selected cell is in the first operating state and at least one discovery signal transmitted by the selected cell and received by UE when the selected cell is in the first operating, the first operating state being a dormant state and instructing the selected cell to change from the intermediate state to the second operating state based on second signaling information between the serving cell and the selected cell, third signaling information between the serving cell and the UE and transmission information between the UE and the selected cell, the intermediate state being between the first operating state and the second operating state, the second operating state being an on state where the selected cell serves the UE.

In an example embodiment, the instructing the selected cell to change to the intermediate state includes providing, by the serving cell, discovery signals configuration information for the selected cell to the UE, the discovery signals configuration information indicating a configuration of the at least discovery signal transmitted by the selected cell in a first operating state, receiving the first signaling information, the first signaling information including at least one measurement associated with the UE receiving the discovery signals from the selected cell, sending an instruction signal to the selected cell instructing the selected cell to change from the first operating state to the intermediate operating state, the instruction signal channel state information reference signals (CSI-RS) configuration information to the selected cell, the CSI-RS configuration information indicating radio resource of reference signals to use to transmit to the UE and sending the CSI-RS configuration information to the UE.

In an example embodiment, the method further includes receiving feedback from the UE, the feedback indicating CSI measurements from CSI-RS transmissions from the selected cell to the UE.

In an example embodiment, the method further includes sending an activation message and forwarding data to the selected cell, the activation message from the serving cell indicating that the selected cell will be a primary cell for the UE.

In an example embodiment, the at least one measurement is a reference signal received power (RSRP) of the reference signals transmitted in the first operating state.

In an example embodiment, the method further includes transmitting data to the UE from the selected cell only after receiving the activation signal and forwarding data.

At least one example embodiment discloses a selected cell including a processor configured to change the selected cell to an intermediate state from a first operating state based on first signaling information exchanged between a serving cell of a user equipment (UE) and the selected cell in the first operating state and at least one signal received by the selected cell in the first operating state from the UE, the first operating state being a dormant state and operate in the intermediate state based on second signaling information between the serving cell and the selected cell, third signaling information between the serving cell and the UE and transmission information between the UE and the selected cell, the intermediate state being between the first operating state and the second operating state, the second operating state being an on state where the selected cell serves the UE.

In an example embodiment, the processor is further configured to obtain sounding reference signal (SRS) configuration information of a user equipment (UE) from a serving cell of the UE, obtain a reference signal from the UE in the first operating state based on the SRS configuration information, determine whether a measurement associated with the reference signal exceeds a threshold and change to the intermediate state if the measurement exceeds the threshold.

In an example embodiment, the processor is further configured to send a signaling information to the serving cell, the signaling information including the measurement when the measurement exceeds the threshold and receive channel state information reference signals (CSI-RS) configuration information, from the serving cell, for the selected cell based on the signaling information if the serving cell determines the selected cell is in preparation of changing from the first operating state to the second operating state.

In an example embodiment, the processor is further configured to send CSI-RS signals to the UE and receive a signal from the serving cell receiving a channel state information feedback from the UE based on the measurements of the transmitted CSI-RS signals from the selected cell, the signal from the serving cell instructing the selected cell to change from the intermediate operating state to the second operating state.

In an example embodiment, the processor is further configured to the measurement is a signal to interference plus noise ratio (SINR).

In an example embodiment, the processor is further configured to receive an activation message and forwarding data from the serving cell, the activation message from the serving cell indicating that the selected cell will be a primary cell for the UE.

In an example embodiment, the processor is further configured to send data to the UE only after receiving the activation signal and the forwarding data.

At least one example embodiment discloses a serving cell configured to coordinate a change from a first operating state to a second operating state of a selected cell in a system. The serving cell includes a processor configured to instruct, by a serving cell of a user equipment (UE), the selected cell to change to an intermediate state from the first operating state based on first signaling information between the serving cell of the UE and the UE when the selected cell is in the first operating state and at least one discovery signal transmitted by the selected cell and received by UE when the selected cell is in the first operating, the first operating state being a dormant state and instruct the selected cell to change from the intermediate state to the second operating state based on second signaling information between the serving cell and the selected cell, third signaling information between the serving cell and the UE and transmission information between the UE and the selected cell, the intermediate state being between the first operating state and the second operating state, the second operating state being an on state where the selected cell serves the UE.

In an example embodiment, the processor is further configured to provide, by the serving cell, discovery signals configuration information for the selected cell to the UE, the discovery signals configuration information indicating a configuration of the at least discovery signal transmitted by the selected cell in a first operating state, receive the first signaling information, the first signaling information including at least one measurement associated with the UE receiving the discovery signals from the selected cell, send an instruction signal to the selected cell instructing the selected cell to change from the first operating state to the intermediate operating state, the instruction signal channel state information reference signals (CSI-RS) configuration information to the selected cell, the CSI-RS configuration information indicating radio resource of reference signals to use to transmit to the UE and send the CSI-RS configuration information to the UE.

In an example embodiment, the processor is further configured to receive feedback from the UE, the feedback indicating CSI measurements from CSI-RS transmissions from the selected cell to the UE.

In an example embodiment, the processor is further configured to send an activation message and forwarding data to the selected cell, the activation message from the serving cell indicating that the selected cell will be a primary cell for the UE.

In an example embodiment, the at least one measurement is a reference signal received power of the reference signals (RSRP) transmitted in the first operating state.

In an example embodiment, the processor is further configured to send data to the UE from the selected cell only after receiving the activation signal and forwarding data.

BRIEF DESCRIPTION OF THE DRAWINGS

Example embodiments will be more clearly understood from the following detailed description taken in conjunction with the accompanying drawings. FIGS. 1A-5 represent non-limiting, example embodiments as described herein.

FIG. 1A illustrates a wireless communication system according to an example embodiment;

FIG. 2 illustrates a method of controlling a small cell a small cell in a system according to an example embodiment;

FIG. 3 illustrates a method of controlling a small cell a small cell in a system according to an example embodiment;

FIG. 4 illustrates an example embodiment of a serving cell shown in FIG. 1; and

FIG. 5 illustrates an example embodiment of a small cell shown in FIG. 1.

DETAILED DESCRIPTION

Figure 1A:
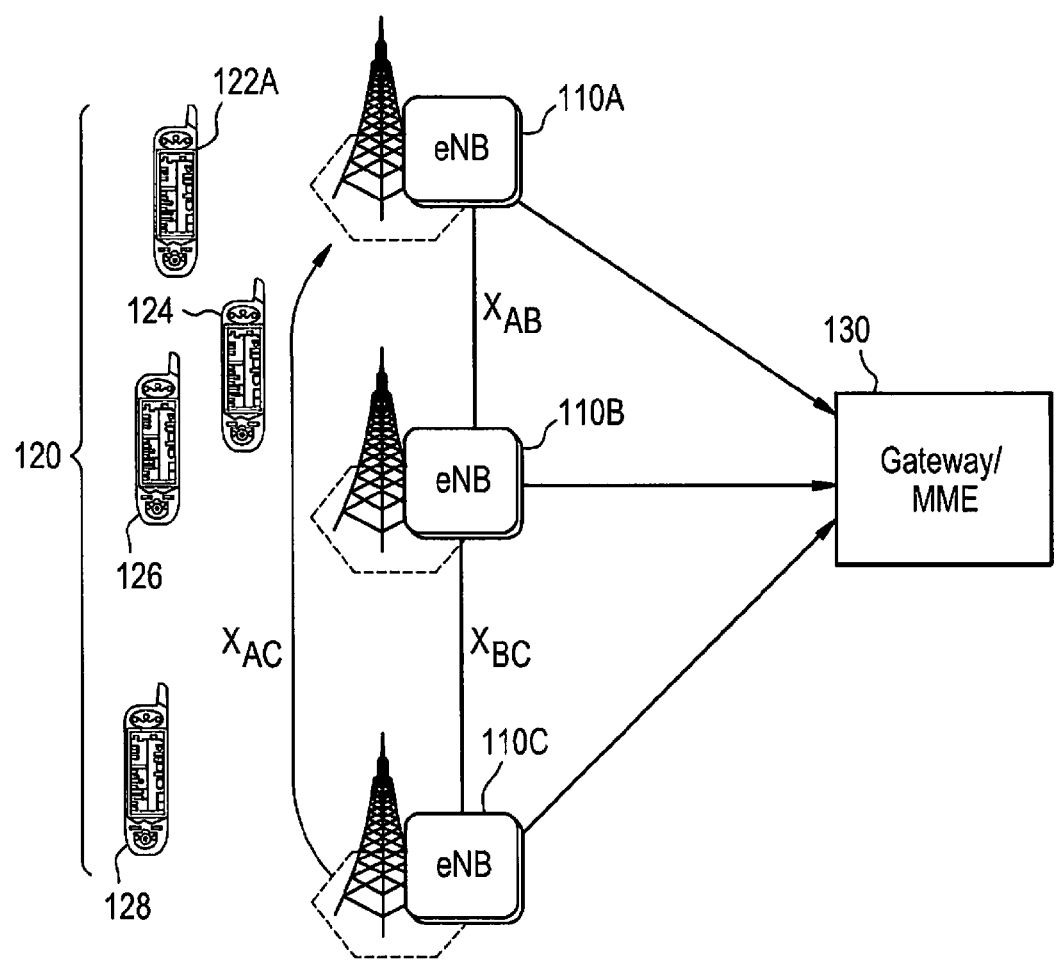

Various example embodiments will now be described more fully with reference to the accompanying drawings in which some example embodiments are illustrated.

Accordingly, while example embodiments are capable of various modifications and alternative forms, embodiments thereof are shown by way of example in the drawings and will herein be described in detail. It should be understood, however, that there is no intent to limit example embodiments to the particular forms disclosed, but on the contrary, example embodiments are to cover all modifications, equivalents, and alternatives falling within the scope of the claims. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Portions of example embodiments and corresponding detailed description are presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

In the following description, illustrative embodiments will be described with reference to acts and symbolic representations of operations (e.g., in the form of flowcharts) that may be implemented as program modules or functional processes including routines, programs, objects, components, data structures, etc., that perform particular tasks or implement particular abstract data types and may be implemented using existing hardware at existing network elements or control nodes. Such existing hardware may include one or more Central Processing Units (CPUs), digital signal processors (DSPs), application-specific-integrated-circuits, field programmable gate arrays (FPGAs) computers or the like.

Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

As disclosed herein, the term "storage medium", "storage unit" or "computer readable storage medium" may represent one or more devices for storing data, including read only memory (ROM), random access memory (RAM), magnetic RAM, core memory, magnetic disk storage mediums, optical storage mediums, flash memory devices and/or other tangible machine readable mediums for storing information. The term "computer-readable medium" may include, but is not limited to, portable or fixed storage devices, optical storage devices, and various other mediums capable of storing, containing or carrying instruction(s) and/or data.

Furthermore, example embodiments may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a computer readable storage medium. When implemented in software, a processor or processors will perform the necessary tasks.

A code segment may represent a procedure, function, subprogram, program, routine, subroutine, module, software package, class, or any combination of instructions, data structures or program statements. A code segment may be coupled to another code segment or a hardware circuit by passing and/or receiving information, data, arguments, parameters or memory contents. Information, arguments, parameters, data, etc. may be passed, forwarded, or transmitted via any suitable means including memory sharing, message passing, token passing, network transmission, etc.

As used herein, the term "user equipment" or "UE" may be synonymous to a user equipment, mobile station, mobile user, access terminal, mobile terminal, user, subscriber, wireless terminal, terminal and/or remote station and may describe a remote user of wireless resources in a wireless communication network. Accordingly, a UE may be a wireless phone, wireless equipped laptop, wireless equipped appliance, etc.

The term "base station" may be understood as a one or more cell sites, base stations, nodeBs, enhanced NodeBs, access points, and/or any terminus of radio frequency communication. Although current network architectures may consider a distinction between mobile/user devices and access points/cell sites, the example embodiments described hereafter may also generally be applicable to architectures where that distinction is not so clear, such as ad hoc and/or mesh network architectures, for example.

Communication from the base station to the UE is typically called downlink or forward link communication. Communication from the UE to the base station is typically called uplink or reverse link communication.

Serving base station may refer to the base station currently handling communication needs of the UE.

FIG. 1A illustrates a system according to an example embodiment. A wireless communications system 100 may follow, for example, a Long Term Evolution (LTE) protocol. It should be understood that example embodiments are not limited to LTE.

Wireless communications system 100 includes a first base station 110A; a second base station 110B; a third base station 110C; a plurality of user equipments (UEs) 120 including first UE 122; second UE 124; third UE 126; and fourth UE 128; a Gateway/MME 130. Each base station 110A-110C may have a coverage area which may include a single cell or a plurality of cells. The base stations 110A-110C may be eNBs.

The base stations 110A-110C and the gateway/MME 130 may include one or more processors and an associated memory operating together to achieve their respective functionality. The gateway/MME 130 may include one or more mobility management entities (MME), a Home eNB Gateway, a security gateway and/or one or more operations, administration and management (OAM) nodes (not shown). Further, the MME may include the OAM node. For the convenience of illustration, the gateway/MME 130 is illustrated as a single node, however, it should be understood that the gateway/MME 130 may be represented as separate nodes.

It should be noted that the wireless communications system 100 is not limited to the features shown therein. These features are shown for explanation of example embodiments. It should be understood that the wireless communications system 100 may include common features such as a home subscriber server (HSS), an Off-line charging System (OFCS), a serving gateway (S-GW), and a public data network (PDN) gateway (P-GW).

The UEs 120 may be in wireless communication with at least a respective one of the first base station 110A, the second base station 110B and the third base station 110C. The UEs 120 may be, for example, mobile phones, smart phones, computers, or personal digital assistants (PDAs). The first base station 110A, the second base station 110B and the third base station 110C communicate with each other over interfaces such as X2 interfaces. More specifically, the first base station 110A and the base station 110B communicate over an interface $X_{AB}$, the third base station 110C and the second base station 110B communicate over an interface $X_{BC}$ and the first base station 110A and the third base station 110C communicate over an interface $X_{AC}$.

The gateway/MME 130 communicates with the first base station 110A, the second base station 110B and the third base station 110C over Si interfaces, respectively.

For a particular UE 120, one of the carriers in one of the base stations 110A-110C operates as the serving cell and the other carrier in the same (if the base station includes multiple carriers) or a different base station may operate as a dormant cell.

Figure 1B:
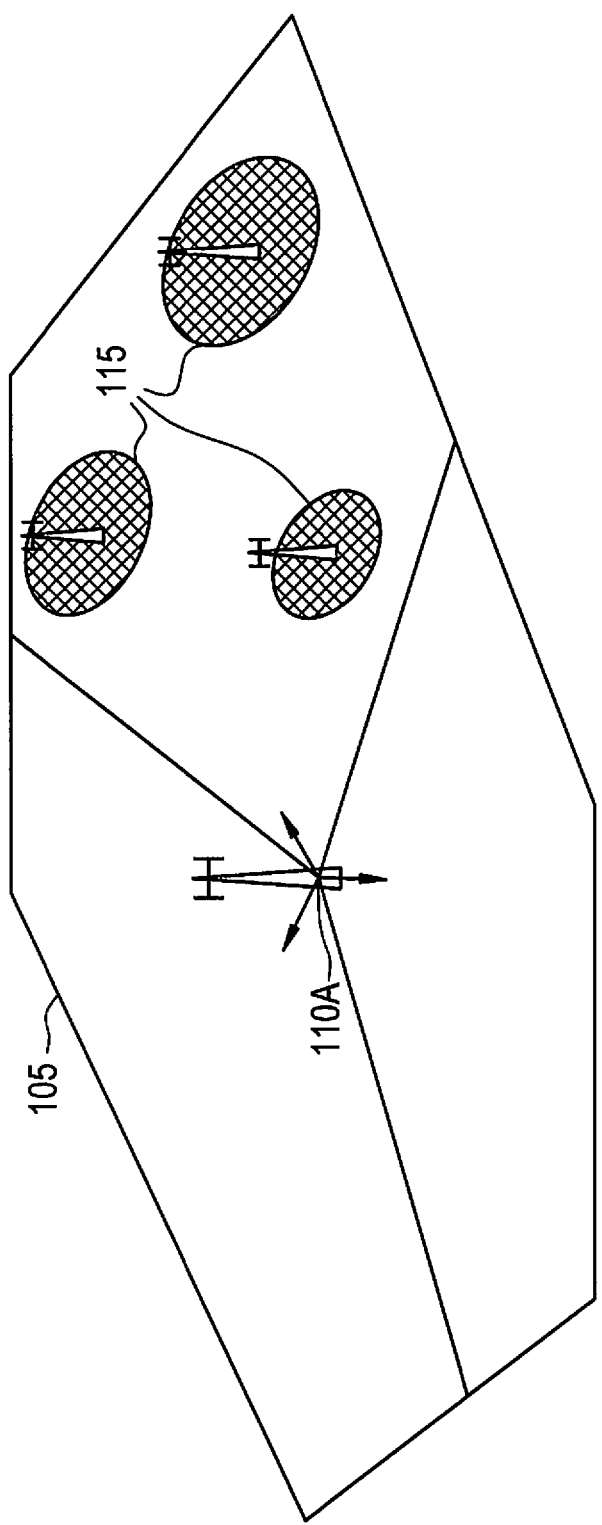
FIG. 1B illustrates a serving cell having a coverage area according to an example embodiment.

FIG. 1B illustrates a serving cell having a coverage area 105. In the example of FIG. 1B, the serving cell is the base station 110A serving a UE (e.g., UE 120). Each cell may include one or more antennas 115 associated with, for example, a base station or multiple base stations. To reduce interference in neighboring cells, the small cell is turned off when data traffic are not served by the small cell. Moreover, the small cell turns on when data traffic would be served by the small cell. The turning ON/OFF may be performed by the network (e.g., gateway/MME 130) using signaling over Si interfaces, for example, or by the small cell.

In non-homogeneous dense small cell deployments, a UE could be covered by one or more small cells. In FIG. 1B, each small cell is a low-power eNB with its own cell ID. Turning the small cell ON or OFF is a network control scheme for system operation and performance. Turning a small cell OFF is mostly an eNB implementation issue. For example, a small cell may turn off when no UEs are under the coverage of the small cell, there is no data traffic to serve for those UEs under the coverage of the small cell and data traffic for those UEs under the coverage of the small cell and would be best served by other cell in the neighborhood.

When a small cell is turned OFF, the small cell enters a dormant state.

A small cell may turn on from a dormant state when one or more UEs are moving under the coverage of the small cell, data traffic arrival for those UEs in the coverage of the small cell and a network control function determines to have the dormant cell serve those UEs under the coverage of the small cell, who are currently served by neighboring cell, for example.

Example embodiments disclose methods to turn on the small cell from a dormant state and have a UE under the service of the small cell within 40 ms. Small cell on/off improves the system capacity through interference mitigation when the cell switching transition time is below 40 ms. The gain of system performance increases as the transition time decreases. The typical transition time of service switching from one cell to the other cell is in the range of hundreds of ms to seconds. In order to reduce the transition time of service switching below 40 ms, most procedures and measurements are performed when small cell is in the Off/dormant (first state) and pseudo-on (intermediate) states.

UEs are connected concurrently to the serving cell and virtually to the dormant small cell, which is similar to CoMP dynamic point selection scheme. The UEs are switched over to the newly activated small cell and receive DL data in a short time since all measurements and channel tracking are done during the Pseudo-On state.

As described below, UEs virtually connect to the dormant small cell and a dormant small cell moves to a pseudo-on state before it is triggered to turn ON. When a dormant cell moves to the pseudo-on state, the dormant cell is prepared to turn on and provide service to UEs. The design of a small cell in Pseudo-On state is to have UEs complete the desired physical layer procedures, such as measuring the CSI and tracking the channel of dormant cell, and higher layer procedures, such new configurations of CSI-RS and CSI feedbacks, in preparation of turning on the dormant small cell. Once the physical layer procedure and higher procedures from the dormant cell are complete, the UEs have concurrent connections to both the serving cell and the dormant cell in Pseudo-On state. The transition time of service switch from serving cell to newly activated dormant cell is reduced.

Figure 2:
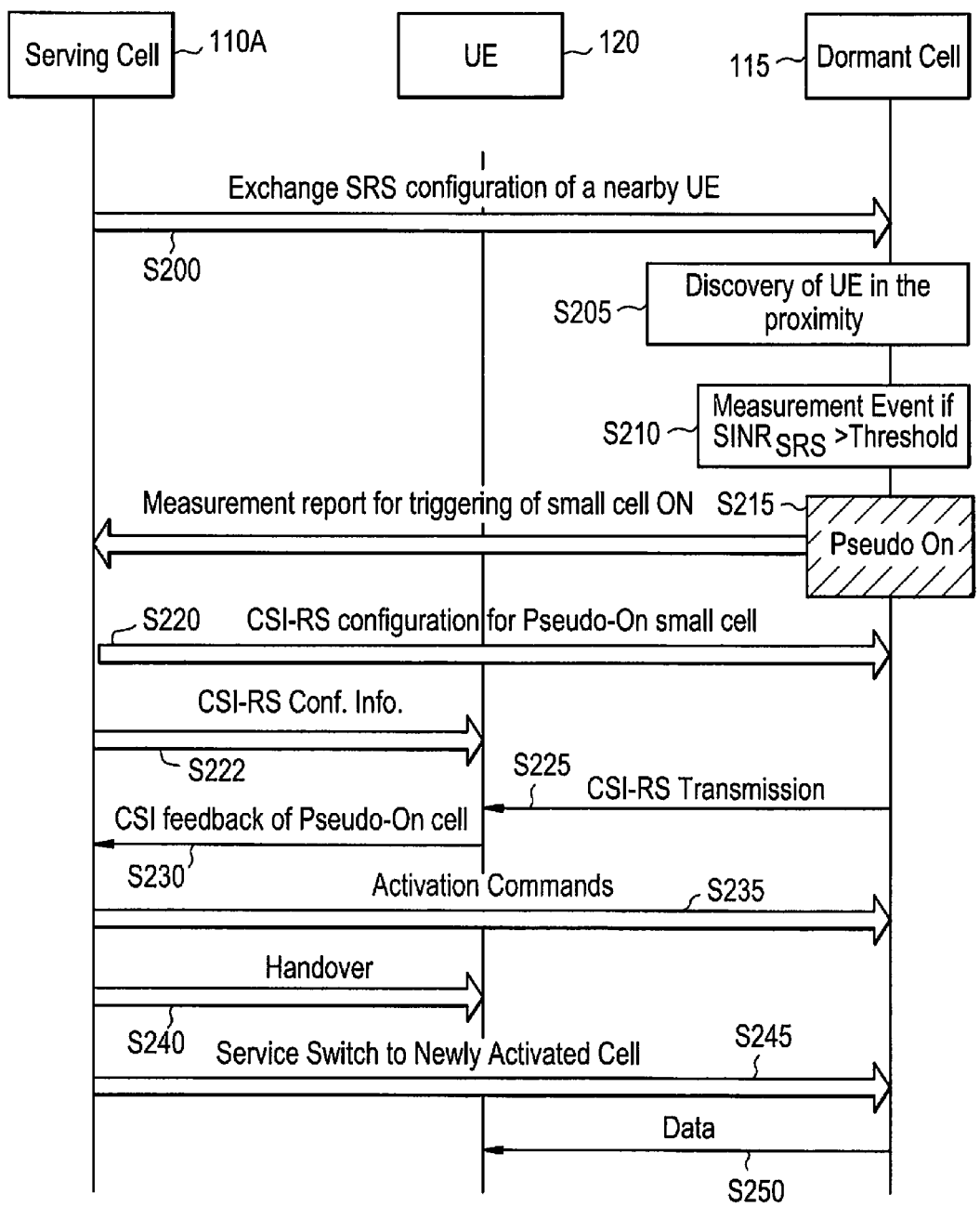

FIG. 2 illustrates a method of controlling a small cell in a system according to an example embodiment. The method may be performed by one of the small cells 115, one of the UEs 120 and the base stations 110A, for example. In the method of FIG. 2, the small cell 115 is an eNB and the base station 110A is another eNB. The communications between the small cell 115 and the base station 110A occur using the X2 interface. However, it should be understood that the method is not limited thereto.

At S200, the small cell is in a dormant state. The small cell obtains configuration information of the UE 120 from the serving cell of the UE. The configuration information includes information regarding the UE's sounding reference signal (SRS). The configuration allows the small cell to receive the UE's SRS and determine whether the UE is within a coverage area of the small cell, at S205.

At S210, the small cell determines a signal to interference plus noise ratio (SINR) of the received SRS from the UE. The small cell then determines if the SINR exceeds a threshold. If the SINR exceeds the threshold, the dormant small cell sends a message indicating a CONNECTED mode UE within its coverage to the serving cell (or other entities in the network) as a reference for the triggering decision of small cell ON (activated).

At S220, the serving cell sends channel state information reference signals (CSI-RS) configuration information to the small cell in the pseudo-on state. Moreover, at S222, the serving cell sends the CSI-RS configuration to the UE. The CSI-RS configuration information is the resource element allocation of CSI-RS signals.

Using the CSI-RS configuration information, the small cell in the dormant state performs CSI-RS transmissions, at S225. The UE measures channel state information (CSI) from the CSI-RS transmissions from the dormant small cell. To reduce transition time from OFF to ON, the UE performs CSI measurements and channel tracking of the small cell during the pseudo-on state and provides feedback of the CSI transmissions to the serving cell, as S230. Consequently, the UE has a virtual connection to the small cell when the small cell is in the pseudo-on state.

At S235, the serving cell sends an activation command to the small cell. The activation command is a signaling message for activation. At S240, serving cell sends a handover command to the UE. The handover command indicates that the newly activated small cell is the new serving cell.

At S245, the serving cell sends a service switch command and forwards the received data traffic to the newly activated small cell. Once the small cell receives the service switch at S245, the small cell may transmit data to the UE at S250.

Figure 3:
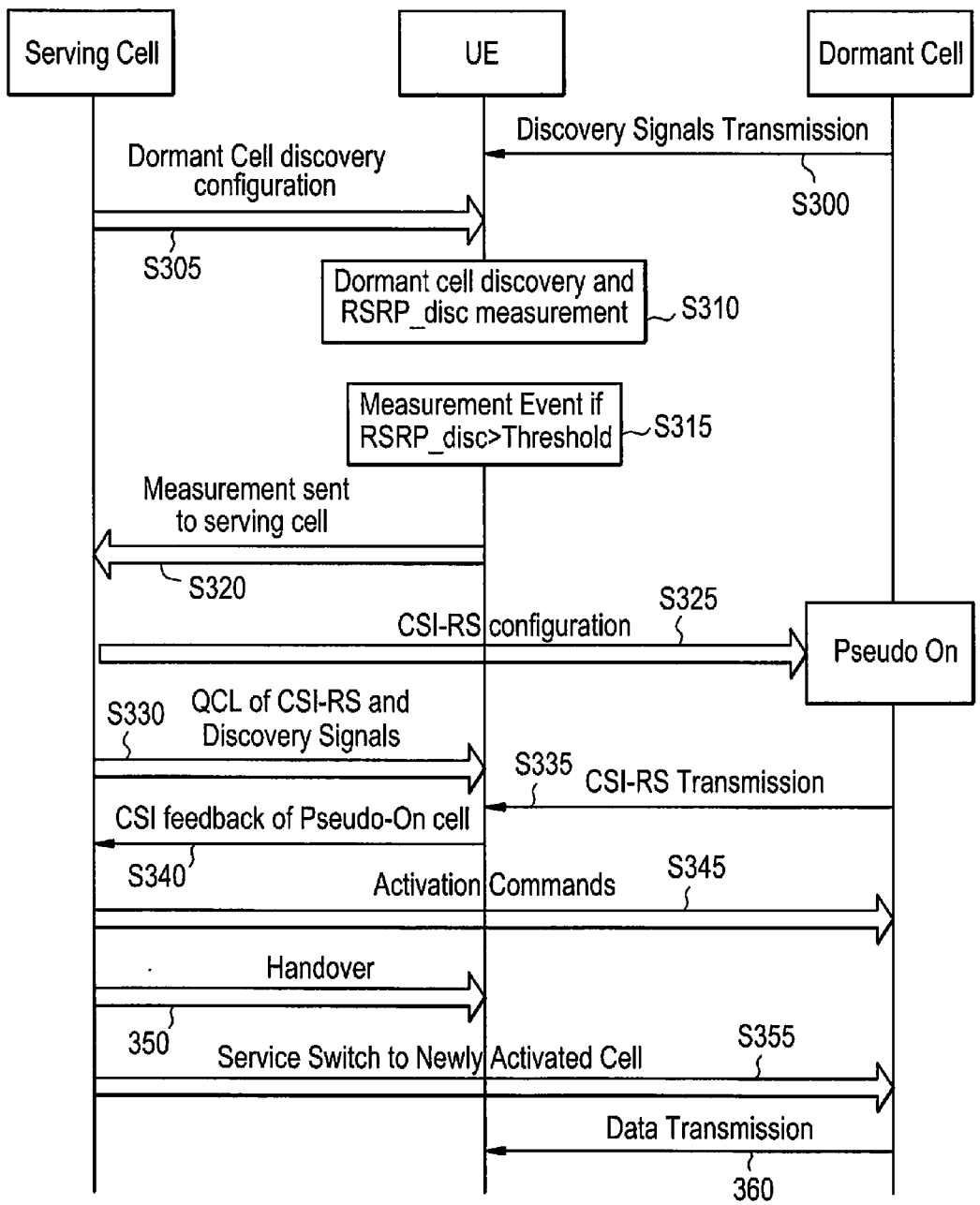

FIG. 3 illustrates a method of controlling a small cell in a system according to an example embodiment. In the method of FIG. 3, the small cell 115 is an eNB and the base station 110A is another eNB. The communications between the small cell 115 and the base station 110A occur using the X2 interface. However, it should be understood that the method is not limited thereto.

At S300, the small cell transmits discovery signals. At S305, the serving cell sends discovery signals configuration information to the UE. The discovery signals configuration information indicates a configuration of the discovery signals from the dormant small cell. For example, the discovery signals configuration information may indicate subframe and time when the small cell in the dormant state transmits a discovery signal. The UE detects the existence of the small cell from the discovery signals and complete procedures of measurement and channel tracking before small cell is turned on, as described below. The UE may perform both cell search of active cell and discovery of new discovery signals from dormant cell.

After UE discovering the dormant cell, the UE performs a received power reference signal (RSRP) measurement based on the received discovery signal for radio resource management (RRM) and mobility, at S310.

At S315, the UE determines if the RSRP exceeds a threshold. If the RSRP exceeds the threshold, the UE transmits a measurement report to the serving cell (or other entities in the network) as a reference for the triggering decision of the small cell to ON, at S320. The measurement report is a reference measurement feedback to the network for triggering of dormant small cell to ON.

At S325, the serving cell sends the small cell channel state information reference signals (CSI-RS) configuration information. At S330, the serving cell indicates to the UE the quasi co-located (QCL) information between CSI-RS and the discovery signals. Using the QCL information, the UE performs channel tracking of the pseudo-on small cell at S335-S340.

More specifically, using the CSI-RS configuration information, the small cell performs CSI-RS transmissions, at S335. The UE measures the channel state information from the CSI-RS transmissions from the dormant small cell. To reduce transition time from OFF to ON, the UE performs CSI measurements and channel tracking of the small cell during the pseudo-on state and provides feedback of the CSI transmissions to the serving cell, as S340. Consequently, the UE has a virtual connection to the small cell when the small cell is in the pseudo-on state.

Steps S345, S350, S355 and S360 are the same as S235, S240, S245 and S250, respectively. Therefore, for the sake of brevity, S345, S350, S355 and S360 will not be described in greater detail.

Figure 4:
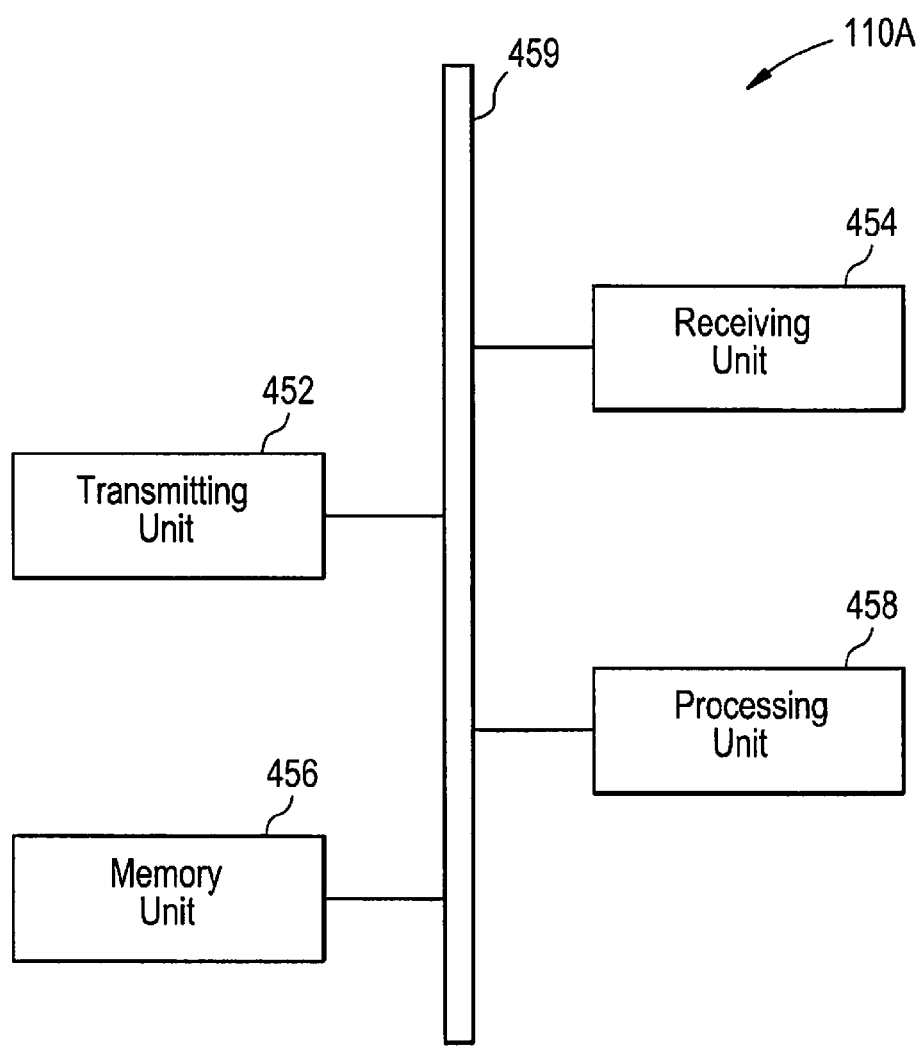

FIG. 4 illustrates an example embodiment of the base station 110A. It should be also understood that the base station 110A may include features not shown in FIG. 4 and should not be limited to those features that are shown.

Referring to FIG. 4, the base station 110A may include, for example, a data bus 459, a transmitting unit 452, a receiving unit 454, a memory unit 456, and a processing unit 458.

The transmitting unit 452, receiving unit 454, memory unit 456, and processing unit 458 may send data to and/or receive data from one another using the data bus 459. The transmitting unit 452 is a device that includes hardware and any necessary software for transmitting wireless signals including, for example, data signals, control signals, and signal strength/quality information via one or more wireless connections to other network elements in the wireless communications network 100. The transmitting unit 452, in conjunction with the processing unit 458, is configured to provide discovery signals configuration information for a small cell to the UE, the discovery signals configuration information indicating a configuration of discovery signals to be transmitted by the small cell in a first operating state.

The receiving unit 454 is a device that includes hardware and any necessary software for receiving wireless signals including, for example, data signals, control signals, and signal strength/quality information via one or more wireless connections to other network elements in the network 100. The receiving unit 454, in conjunction with the processing unit 458, is configured to receive at least one measurement from the UE, the at least one measurement associated with the UE receiving the discovery signals from the small cell.

The memory unit 456 may be any device capable of storing data including magnetic storage, flash storage, etc. The memory unit 256 is used for data and controlling signal buffering and storing for supporting pre-scheduling and the scheduled data transmissions and re-transmissions.

The processing unit 458 may be any device capable of processing data including, for example, a microprocessor configured to carry out specific operations based on input data, or capable of executing instructions included in computer readable code.

For example, the processing unit 458 is configured to perform the calculations and algorithms described in FIGS. 2-3 for the serving cell.

Figure 5:
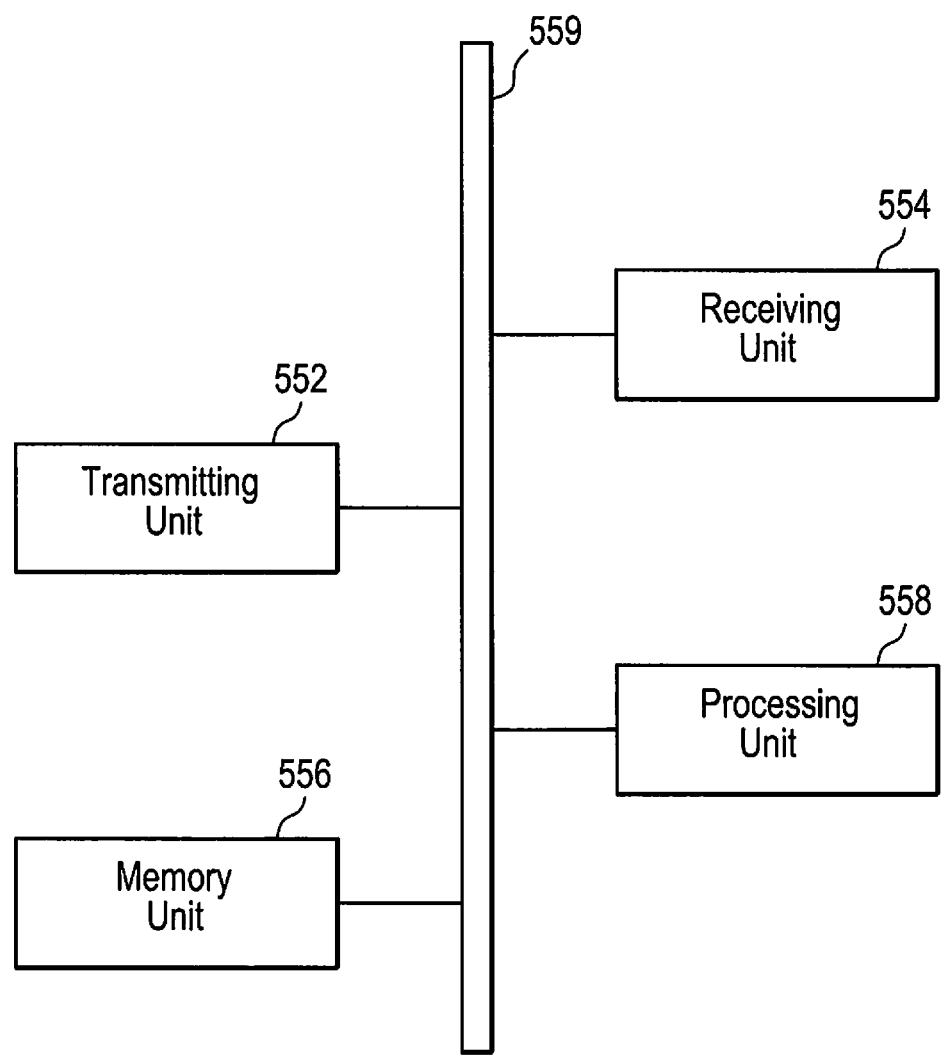

FIG. 5 illustrates an example embodiment of a small cell. It should be also understood that the small cell may include features not shown in FIG. 5 and should not be limited to those features that are shown.

Referring to FIG. 5, the small cell may include, for example, a data bus 559, a transmitting unit 552, a receiving unit 554, a memory unit 556, and a processing unit 558.

The transmitting unit 552, receiving unit 554, memory unit 556, and processing unit 558 may send data to and/or receive data from one another using the data bus 559. The transmitting unit 552 is a device that includes hardware and any necessary software for transmitting wireless signals including, for example, data signals, control signals, and signal strength/quality information via one or more wireless connections to other network elements in the wireless communications network 100.

The receiving unit 554 is a device that includes hardware and any necessary software for receiving wireless signals including, for example, data signals, control signals, and signal strength/quality information via one or more wireless connections to other network elements in the network 100. The receiving unit 554, in conjunction with the processing unit 558, is configured to configured to obtain, a first operating state, configuration information of a user equipment (UE) from a serving cell of the UE, the first operating state being a dormant state and obtain a reference signal from the UE in the first operating state based on the configuration information The memory unit 556 may be any device capable of storing data including magnetic storage, flash storage, etc. The memory unit 256 is used for data and controlling signal buffering and storing for supporting pre-scheduling and the scheduled data transmissions and re-transmissions.

The processing unit 558 may be any device capable of processing data including, for example, a microprocessor configured to carry out specific operations based on input data, or capable of executing instructions included in computer readable code.

For example, the processing unit 558 is configured to perform the calculations and algorithms described in FIGS. 2-3 for the small cell, such as determine whether a measurement associated with the reference signal exceeds a threshold and trigger a change of a present operating state of the small cell from the first operating state to the second operating state if the measurement exceeds the threshold Example embodiments being thus described, it will be obvious that the same may be varied in many ways. Such variations are not to be regarded as a departure from the spirit and scope of example embodiments, and all such modifications as would be obvious to one skilled in the art are intended to be included within the scope of the claims.

What is claimed is:

1. A method of coordinating a change from a first operating state to a second operating state of a selected cell in a system, the method comprising:

changing to an intermediate state from the first operating state based on first signaling information exchanged between a serving cell of a user equipment (UE) and the selected cell in the first operating state and at least one signal received by the selected cell in the first operating state from the UE, the first operating state being a dormant state, the changing to an intermediate state including, obtaining, by the selected cell in the first operating state, sounding reference signal (SRS) configuration information of a user equipment (UE) from a serving cell of the UE, obtaining a reference signal from the UE in the first operating state based on the SRS configuration information, determining whether a measurement associated with the reference signal exceeds a threshold, and changing to the intermediate state if the measurement exceeds the threshold; and operating in the intermediate state based on second signaling information between the serving cell and the selected cell, third signaling information between the serving cell and the UE and transmission information between the UE and the selected cell, the intermediate state being between the first operating state and the second operating state, the second operating state being an on state where the selected cell serves the UE.

2. The method of claim 1, wherein the operating in the intermediate state includes, sending a signaling information to the serving cell, the
signaling information including the measurement when
the measurement exceeds the threshold; and
receiving channel state information reference signals
(CSI-RS) configuration information, from the serving
cell, for the selected cell based on the signaling information if the serving cell determines the selected cell is in preparation of changing from the first operating state to the second operating state.

3. The method of claim 1, further comprising:
transmitting CSI-RS signals to the UE; and
receiving a signal from the serving cell receiving a channel state information feedback from the UE based on the measurements of the transmitted CSI-RS signals from the selected cell, the signal from the serving cell instructing the selected cell to change from the intermediate operating state to the second operating state.

4. The method of claim 1, wherein the measurement is a signal to interference plus noise ratio (SINR).

5. The method of claim 1, the operating in the intermediate state includes,
receiving an activation message and forwarding data from the serving cell, the activation message from the serving cell indicating that the selected cell will be a primary cell for the UE.

6. The method of claim 5, further comprising:
transmitting data to the UE only after receiving the activation signal and the forwarding data.

7. A method of coordinating a change from a first operating state to a second operating state of a selected cell in a system, the method comprising:
instructing, by a serving cell of a user equipment (UE), the selected cell to change to an intermediate state from the first operating state based on first signaling information between the serving cell of the UE and the UE when the selected cell is in the first operating state and at least one discovery signal transmitted by the selected cell and received by UE when the selected cell is in the first operating, the first operating state being a dormant state, the instructing the selected cell to change to an intermediate state including,
providing, by the serving cell, discovery signals configuration information for the selected cell to the UE, the discovery signals configuration information indicating a configuration of the at least discovery signal transmitted by the selected cell in a first operating state,
receiving the first signaling information, the first signaling information including at least one measurement associated with the UE receiving the discovery signals from the selected cell,
sending an instruction signal to the selected cell instructing the selected cell to change from the first operating state to the intermediate operating state, the instruction signal channel state information reference signals (CSI-RS) configuration information to the selected cell, the CSI-RS configuration information indicating radio resource of reference signals to use to transmit to the UE, and
sending the CSI-RS configuration information to the UE; and
instructing the selected cell to change from the intermediate state to the second operating state based on second signaling information between the serving cell and the selected cell, third signaling information between the serving cell and the UE and transmission information between the UE and the selected cell, the intermediate state being between the first operating state and the second operating state, the second operating state being an on state where the selected cell serves the UE.

8. The method of claim 7, further comprising:
receiving feedback from the UE, the feedback indicating CSI measurements from CSI-RS transmissions from the selected cell to the UE.

9. The method of claim 8, further comprising:
sending an activation message and forwarding data to the selected cell, the activation message from the serving cell indicating that the selected cell will be a primary cell for the UE.

10. The method of claim 7, wherein the at least one measurement is a reference signal received power (RSRP) of the reference signals transmitted in the first operating state.

11. The method of claim 7, further comprising:
transmitting data to the UE from the selected cell only after receiving the activation signal and forwarding data.

12. A selected cell comprising:
a processor configured to,
change the selected cell to an intermediate state from a first operating state based on first signaling information exchanged between a serving cell of a user equipment (UE) and the selected cell in the first operating state and at least one signal received by the selected cell in the first operating state from the UE, the first operating state being a dormant state, the processor configured to,
obtain sounding reference signal (SRS) configuration information of a user equipment (UE) from a serving cell of the UE,
obtain a reference signal from the UE in the first operating state based on the SRS configuration information,
determine whether a measurement associated with the reference signal exceeds a threshold, and
change to the intermediate state if the measurement exceeds the threshold; and
operate in the intermediate state based on second signaling information between the serving cell and the selected cell, third signaling information between the serving cell and the UE and transmission information between the UE and the selected cell, the intermediate state being between the first operating state and the second operating state, the second operating state being an on state where the selected cell serves the UE.

13. The selected cell of claim 12, wherein the processor is further configured to,
send a signaling information to the serving cell, the signaling information including the measurement when the measurement exceeds the threshold; and
receive channel state information reference signals (CSI-RS) configuration information, from the serving cell, for the selected cell based on the signaling information if the serving cell determines the selected cell is in preparation of changing from the first operating state to the second operating state.

14. The selected cell of claim 12, wherein the processor is further configured to,
send CSI-RS signals to the UE; and
receive a signal from the serving cell receiving a channel state information feedback from the UE based on the measurements of the transmitted CSI-RS signals from the selected cell, the signal from the serving cell instructing the selected cell to change from the intermediate operating state to the second operating state.

15. The selected cell of claim 12, wherein the measurement is a signal to interference plus noise ratio (SINR).

16. The selected cell of claim 12, wherein the processor is further configured to,
receive an activation message and forwarding data from the serving cell, the activation message from the serving cell indicating that the selected cell will be a primary cell for the UE.

17. The selected cell of claim 16, wherein the processor is further configured to,
send data to the UE only after receiving the activation signal and the forwarding data.

18. A serving cell configured to coordinate a change from a first operating state to a second operating state of a selected cell in a system, the serving cell comprising:
a processor configured to,
instruct, by a serving cell of a user equipment (UE), the selected cell to change to an intermediate state from the first operating state based on first signaling information between the serving cell of the UE and the UE when the selected cell is in the first operating state and at least one discovery signal transmitted by the selected cell and received by UE when the selected cell is in the first operating, the first operating state being a dormant state, the processor configured to,
provide, by the serving cell, discovery signals configuration information for the selected cell to the UE, the discovery signals configuration information indicating a configuration of the at least discovery signal transmitted by the selected cell in a first operating state,
receive the first signaling information, the first signaling information including at least one measurement associated with the UE receiving the discovery signals from the selected cell,
send an instruction signal to the selected cell instructing the selected cell to change from the first operating state to the intermediate operating state, the instruction signal channel state information reference signals (CSI-RS) configuration information to the selected cell, the CSI-RS configuration information indicating radio resource of reference signals to use to transmit to the UE, and
send the CSI-RS configuration information to the UE; and
instruct the selected cell to change from the intermediate state to the second operating state based on second signaling information between the serving cell and the selected cell, third signaling information between the serving cell and the UE and transmission information between the UE and the selected cell, the intermediate state being between the first operating state and the second operating state, the second operating state being an on state where the selected cell serves the UE.

19. The serving cell of claim 18, wherein the processor is further configured to,
receive feedback from the UE, the feedback indicating CSI measurements from CSI-RS transmissions from the selected cell to the UE.

20. The serving cell of claim 19, wherein the processor is further configured to,
send an activation message and forwarding data to the selected cell, the activation message from the serving cell indicating that the selected cell will be a primary cell for the UE.

21. The serving cell of claim 18, wherein the at least one measurement is a reference signal received power of the reference signals (RSRP) transmitted in the first operating state.

22. The serving cell of claim 18, wherein the processor is further configured to,
send data to the UE from the selected cell only after receiving the activation signal and forwarding data.

* * * * *